(12) United States Patent
Silvlin et al.

(10) Patent No.: US 10,108,195 B2
(45) Date of Patent: Oct. 23, 2018

(54) GAP SELECTION METHOD AND SYSTEM

(71) Applicant: VOLVO CAR CORPORATION, Gothenburg (SE)

(72) Inventors: Jonatan Silvlin, Gothenburg (SE); Mattias Erik Brannstrom, Gothenburg (SE); Julia Nilsson, Gothenburg (SE); Mohammad Ali, Angered (SE)

(73) Assignee: Volvo Car Corporation, Gothenburg (SE)

( * ) Notice: Subject to any disclaimer, the term of this patent is extended or adjusted under 35 U.S.C. 154(b) by 120 days.

(21) Appl. No.: 15/286,756

(22) Filed: Oct. 6, 2016

(65) Prior Publication Data

US 2017/0102705 A1  Apr. 13, 2017

(30) Foreign Application Priority Data

Oct. 13, 2015 (EP) .................................... 15189538

(51) Int. Cl.
*G05D 1/02* (2006.01)
*G05D 1/00* (2006.01)
*B60W 30/16* (2012.01)
*G08G 1/16* (2006.01)

(52) U.S. Cl.
CPC ........... *G05D 1/0212* (2013.01); *B60W 30/16* (2013.01); *G05D 1/0088* (2013.01); *G08G 1/167* (2013.01)

(58) Field of Classification Search
CPC .... G05D 1/0212; G05D 1/0088; G08G 1/167; B60W 30/16
See application file for complete search history.

(56) References Cited

U.S. PATENT DOCUMENTS 5,521,579 A * 5/1996 Bernhard ........... B60K 31/0008
                                                        180/167
2008/0201050 A1   8/2008 Placke et al.

FOREIGN PATENT DOCUMENTS

EP   1598233 A2   11/2005
EP   1598233 A3    7/2006

OTHER PUBLICATIONS

Extended European Search Report for European Application No. EP 15189538.0, Completed by the European Patent Office, dated May 4, 2016, 9 Pages.

* cited by examiner

*Primary Examiner* — Mussa A Shaawat
*Assistant Examiner* — Michael V Kerrigan
(74) *Attorney, Agent, or Firm* — Brooks Kushman P.C.

(57) ABSTRACT

A gap selection method performed by a gap selection system for a vehicle. The vehicle travels on a road having a first lane and a second lane adjacent to the first. The vehicle travels in the first lane, a first surrounding vehicle travels in the second lane, a second surrounding vehicle travels in the second lane ahead of the first surrounding vehicle with a first gap between the first and second surrounding vehicles. The method includes determining a first minimum safety margin between the first surrounding vehicle and the vehicle, determining a second minimum safety margin between the second surrounding vehicle and the vehicle, evaluating the first gap by determining a minimum limit for a longitudinal position of the vehicle, determining a maximum limit for a longitudinal position of the vehicle, and determining a lane change appropriateness value of the first gap utilizing the minimum limit and the maximum limit.

14 Claims, 4 Drawing Sheets

300: Gap selection system

310: Unit for determining a minimum safety margin

320: Unit for determining a minimum limit

330: Unit for determining a maximum limit

340: Unit for determining a lane change appropriateness

350: Sensing system for surrounding vehicles

360: Unit for determining if lane change desirable

370: Unit for planning a trajectory

Figure 3

GAP SELECTION METHOD AND SYSTEM

CROSS-REFERENCE TO RELATED APPLICATIONS

This application claims foreign priority benefits under 35 U.S.C. § 119(a)-(d) to European patent application number EP 15189538.0, filed Oct. 13, 2015, which is incorporated by reference in its entirety.

TECHNICAL FIELD

The present disclosure relates to a gap selection method being performed by a gap selection system for a vehicle. The disclosure further relates to a gap selection system for a vehicle and to a vehicle comprising such a gap selection system.

BACKGROUND

When a partially automated, semi-automated or fully automated vehicle drives on a road comprising more than one lane going in the same direction, a lane change is sometimes desirable, e.g. when there is a slow preceding vehicle or when there is a faster vehicle coming from behind. A lane change may also be desirable when the own lane ends. In order to perform the lane change maneuver a gap may have to be selected in a target lane.

Patent document US 2008201050 A discloses a gap indicator including a surround sensor system for recording the traffic surround field including the traffic in at least one adjacent lane, an identification device for determining gaps in the traffic sufficient for a lane change, and a dialog device for the output of detailed driving instructions to the driver of the host motor vehicle.

The system and method described in US2008201050A assists the driver, i.e. the driver performs the gap selection, and also the lane change. However, US2008201050 A does not give details about how to evaluate the gaps.

There is thus a desire for an improved gap selection method and an improved system for gap selection.

SUMMARY

The object of the present disclosure is to overcome or ameliorate at least one of the disadvantages of the prior art, or to provide a useful alternative.

The object above may be achieved by the subject-matter disclosed herein. Embodiments are set forth in the appended claims, in the following description, and in the drawings.

Thus, according to the disclosure, there is provided a gap selection method being performed by a gap selection system for a vehicle. The vehicle travels on a road comprising a first lane and a second lane being adjacent to the first lane. The vehicle travels in the first lane. A first surrounding vehicle travels in the second lane. A second surrounding vehicle travels in the second lane ahead of the first surrounding vehicle with a first gap between the first and second surrounding vehicles. The method comprises determining a first minimum safety margin as a longitudinal distance between the first surrounding vehicle and the vehicle, determining a second minimum safety margin as a longitudinal distance between the second surrounding vehicle and the vehicle, and evaluating the first gap by determining a minimum limit for a longitudinal position of the vehicle utilizing dynamic limitations of the vehicle and a predicted position of the first surrounding vehicle considering the first minimum safety margin, determining a maximum limit for a longitudinal position of the vehicle utilizing dynamic limitations of the vehicle and a predicted position of the second surrounding vehicle considering the second minimum safety margin, and determining a lane change appropriateness of the first gap utilizing the minimum limit and the maximum limit for a longitudinal position of the vehicle.

The gap selection method may be generalized to (k−1) gaps by assuming that a plurality of k surrounding vehicles travel in the second lane with a plurality of (k−1) gaps between two adjacent surrounding vehicles, k being an integer and being at least 2, i being an integer between 1 and k, j being an integer between 1 and (k−1), a j-th gap being located between an i-th surrounding vehicle and an (i+1)-th surrounding vehicle, the method comprising determining a minimum safety margin for an i-th surrounding vehicle as a longitudinal distance between the surrounding vehicle and the vehicle provided with the gap selection system, and evaluating a j-th gap by determining a minimum limit for a longitudinal position of the vehicle utilizing dynamic limitations of the vehicle and a predicted position of the i-th surrounding vehicle behind the gap considering the minimum safety margin related to the i-th surrounding vehicle, determining a maximum limit for a longitudinal position of the vehicle utilizing dynamic limitations of the vehicle and a predicted position of the (i+1)-th surrounding vehicle in front of the gap considering the minimum safety margin related to the (i+1)-th surrounding vehicle, and determining a lane change appropriateness of the gap utilizing the minimum limit and the maximum limit for a longitudinal position of the vehicle provided with the gap selection system.

The method may be performed for one or more of the (k−1) gaps, including for each gap. The order in which the gaps are evaluated may be arbitrary. The gaps may be evaluated in numerical order. However, in practice, it may be best to start with the gap being closest to the vehicle comprising the gap selection system, also denoted the host or ego vehicle herein, and then take the second closest gap and so on. There may further be a maximal limit for how far away the gap is in relation to the ego vehicle in order to be evaluated.

For the case k=2, there will be one gap, i.e. the evaluation of the first gap described above. For k=3, there will be the above-described first gap plus a second gap and so on.

In addition to one or more real surrounding vehicles travelling in the second lane, an virtual surrounding vehicle may be assumed travelling behind the rearmost real surrounding vehicle and/or an virtual surrounding vehicle may be assumed travelling in front of the foremost surrounding vehicle. The virtual surrounding vehicle/vehicles may then be included in the plurality of k surrounding vehicles.

The road comprises at least the first lane and the second lane. There may in addition be one or more additional lanes on the road in the same direction and/or in the other direction.

The term gap relates to a longitudinal distance, e.g. expressed in meters. The term minimum safety margin relates to a longitudinal distance, e.g. expressed in meters. The longitudinal distance is the distance as seen in a direction of the road. If the surrounding vehicle travels in another lane, there is also a lateral distance to the surrounding vehicle. If another vehicle travels in the same lane as the ego vehicle, there is a longitudinal distance to the other vehicle, but only a small lateral distance or even no lateral distance. The longitudinal position of a vehicle relates to the position as seen in the direction of the road. There is also a lateral position component. However, in the gap selection method and system disclosed herein, only the longitudinal distance and longitudinal positions are considered.

A gap selection system may be provided in a partially automated, semi-automated or fully automated vehicle. In a partially automated vehicle or a semi-automated vehicle, a driver of the vehicle performs some of the driving functions, while the vehicle autonomously performs other functions. If the vehicle is fully automated, the vehicle autonomously performs the driving functions, at least for a temporary period of time. A vehicle may be arranged to be able to change between driving manually, partially automated, semi-automated and/or fully automated. The gap selection system as disclosed herein may form part of a system for an automated lane change maneuver.

Sometimes a lane change of the ego vehicle from its current lane, i.e. the first lane, into a target lane, i.e. the second lane, may be desirable, e.g. when there is a slow preceding vehicle in the same lane as the ego vehicle or when there is a faster vehicle coming from behind. A lane change may also be desirable when the lane in which the ego vehicle travels ends, e.g. due to road work. The gap selection method as disclosed herein describes a method suitable for automated gap selection. The gap selection method may form part of an automated lane change maneuver method.

The gap select method performs an evaluation of a target gap in the target lane, and at which time instance the ego vehicle should laterally move into the selected gap. If more than one gap is present, the method may help to select the most appropriate. The method may utilize parameters such as the required control signals to reach the gap, i.e. longitudinal acceleration/deceleration, and/or time instance to initialize the lateral movement into the gap for the selection, which is further described below. Maneuver The ego vehicle is provided with a gap selection system, which is further described below. The gap selection system may be a system of the vehicle. Alternatively, or as a complement, the gap selection system may be a separate mobile device, which can be placed and used in the vehicle. The ego vehicle may further be provided with other systems, which are adapted to determine a position on the road of the ego vehicle and its velocity. The gap selection system may further be able to determine positions and velocities of the surrounding vehicles in relation to the ego vehicle, e.g. by utilizing a sensing system of the vehicle.

The step of determining a maximum limit for a longitudinal position of the vehicle may also consider an additional surrounding vehicle travelling in the first lane in front of the vehicle.

The step of determining a minimum limit for a longitudinal position of the vehicle may also consider an additional surrounding vehicle travelling in the first lane behind the vehicle.

The gap selection method may comprise determining a velocity vE of the ego vehicle, and utilizing the determined velocity of the ego vehicle when determining the minimum safety margin.

The gap selection method may comprise determining relative positions and velocities of one or more of the surrounding vehicles and/or additional surrounding vehicles in relation to the ego vehicle, utilizing the determined relative positions and velocities when determining the minimum safety margin.

The step of determining relative positions and the velocities of the surrounding vehicles and/or additional surrounding vehicles may comprise determining by means of a sensing system of the ego vehicle, which sensing system may comprise any type of known sensor or sensors.

A minimum safety margin, $m_i$, to each surrounding vehicle $S_i$ may e.g. be defined as $$m_i = \begin{cases} tg_f * v_E, & i \in F \\ tg_b * v_i, & i \in B \end{cases} \qquad \text{Eq. 1}$$

wherein F denotes a set of vehicles being longitudinally in front of the ego vehicle E, and B denotes a set of vehicles being longitudinally behind the ego vehicle E. The subscript i is an index going from 1 to the number k of surrounding vehicles. The time gaps $tg_f$ and $tg_b$ respectively denote the minimum time gap to F and B. The sizes of the time gaps $tg_f$ and $tg_b$ depend on the desired level of safety margin. Purely as an example, it may be in the range of from 1 to 3 seconds.

According to Eq. 1, the minimum safety margin for an i-th surrounding vehicle may be determined as a front time gap $t_{gf}$ times the velocity $v_E$ of the ego vehicle for a surrounding vehicle being in front of the ego vehicle E and as a rear time gap $t_{gb}$ times the velocity $v_i$ of the surrounding vehicle for a surrounding vehicle being behind the ego vehicle. The front time gap $t_{gf}$ denotes a minimum desired time gap to a surrounding vehicle being in front of the ego vehicle E. The rear time gap $t_{gb}$ denotes a minimum desired time gap to a surrounding vehicle being behind the ego vehicle E.

The minimum safety margin is expressed as a longitudinal distance. It is typically not constant, but varies over the prediction time, e.g. dependent on the velocities of the vehicles. Further, environmental factors, such as darkness, precipitation and road conditions may influence the minimum safety margin. The minimum safety margin may consider the extension of the ego vehicle E and/or of the surrounding vehicles. The minimum safety margin may be determined to central point of the ego vehicle E and/or of the surrounding vehicles e.g., a center of gravity. As an alternative, the minimum safety margin to a surrounding vehicle may be determined from a point of the surrounding vehicle being closest to the ego vehicle E. For the ego vehicle E, a point being closest to the surrounding vehicle may then be utilized.

The minimum safety margin $m_i$ may depend on the velocity $v_E$ of the ego vehicle E if the surrounding vehicle is ahead of the ego vehicle E, see upper line of Eq. 1. If the surrounding vehicle is behind the ego vehicle E, the minimum safety margin may depend on the velocity $v_i$ of the surrounding vehicle, see lower line of Eq. 1.

When evaluating a gap $g_j$ between two surrounding vehicles, $S_i$ and $S_{i+1}$, minimum and maximum limits for a longitudinal position $x_i$ of the ego vehicle E at a certain point of time are determined, e.g. according to:

$$x_i^{min} = \max(S_i, E_{min}) \qquad \text{Eq. 2}$$

$$x_i^{max} = \min(S_{i+1}, E_{max}) \qquad \text{Eq. 3}$$

$S_i$ denotes the predicted position of the surrounding vehicle being behind the gap $g_j$ considering the respective minimum safety margin determined by Eq. 1 above. $E_{min}$ denotes the minimum possible longitudinal position of the ego vehicle E at that time.

$S_{i+1}$ denotes the predicted position of the surrounding vehicle being in front of the gap $g_j$ considering the minimum safety margin determined by Eq. 1 above. $E_{max}$ denotes the maximum possible longitudinal position of the ego vehicle E at that time.

In case there is another vehicle $S_{rear}^{init}$ traveling in the same lane as the ego vehicle E but behind it, Eq. 2 for the minimum limit may be modified to $$x_i^{min} = \max(S_{rear}^{init}, S_i, E_{min})  \quad \text{Eq. 4}$$

In that case, B as used in Eq. 1 includes the other vehicle being longitudinally behind the ego vehicle E in the current lane of the ego vehicle. Hence, the step of determining a minimum limit for a longitudinal position of the ego vehicle may also consider an additional surrounding vehicle travelling in the first lane behind the ego vehicle.

In case there is another vehicle $S_{front}^{init}$ traveling in the same lane as the ego vehicle E but in front of it, Eq. 3 for the maximum limit may be modified to $$x_i^{max} = \min(S_{front}^{init}, S_{i+1}, E_{max})  \quad \text{Eq. 5}$$

In that case, F as used in Eq. 1 includes the other vehicle being longitudinally in front of the ego vehicle E in the current lane of the ego vehicle. Hence, the step of determining a maximum limit for a longitudinal position of the ego vehicle may also consider an additional surrounding vehicle travelling in the first lane in front of the ego vehicle.

The lane change appropriateness of the first gap $A_1$ may be determined by means of a time-position area, which is determined as a function of the minimum limit and the maximum limit for a longitudinal position of the vehicle during a time span.

Correspondingly, the appropriateness of the j-th gap may be determined by means of a time-position area $A_j$, which is determined as a function of the minimum limit and the maximum limit for a longitudinal position of the vehicle during a time span.

For a certain time interval dt, $dA_i$ may be taken as $$dA_i = (x_i^{max} - x_i^{min}) dt  \quad \text{Eq. 6}$$

If $dA_i$ is negative or zero, there is no available gap.

If dt is set to 1 sec, which purely is an example, the time-position area $A_i$ for the gap $g_j$ may be determined as a sum over the time of the prediction $t_{pred}$:

$$A_i = \sum_{t=0}^{t_{pred}} \max(0, x_i^{max}(t) - x_i^{min}(t))  \quad \text{Eq. 7}$$

Since the time-position area $A_i$ for the gap $g_j$ may be determined by the intersection between the position limitations which the surrounding vehicles impose on the ego vehicle E, and the dynamic limitations $E_{min}$, $E_{max}$ of the ego vehicle E, the size of the time-position area $A_i$ may be correlated with the control signals which are required for the ego vehicle E to reach the corresponding gap $g_j$. As such, a large time-position area $A_i$ indicates that it is easy for the ego vehicle E to reach the gap $g_j$, i.e. low control signals are required, while a small time-position area $A_i$ indicates that it is difficult for the ego vehicle E to reach the gap $g_j$, i.e. large control signals are required.

In order for a gap $g_j$ to be appropriate, the time-position area $A_i$ may be determined to fulfil:

$$A_i > A_{crit}  \quad \text{Eq. 8}$$

i.e., the time-position area $A_i$ for the gap $g_j$ being large enough for the lane change maneuver to be performed, expressed as larger than a critical value $A_{crit}$, which denotes a minimal safety margin over the predicted time span.

Further, it may be desired that the gap $g_j$ is open at least a certain time span expressed as $t_{crit}$, which is a minimum time for the ego vehicle E to laterally move into the target lane. Start time is denoted as $t_i^{start}$ and end time is denoted as $t_i^{end}$.

$$t_i^{end} - t_i^{start} > t_{crit}  \quad \text{Eq. 9}$$

For the case mentioned above with (k−1) gaps, the method may comprise evaluating at least two of the gaps, selecting a desired gap as a gap coming first in time and offering a lane change appropriateness being above a critical value $A_{crit}$.

As an alternative, or a complement, the method may comprise evaluating at least two of the gaps, selecting a desired gap as a gap for which the required control signals, e.g., longitudinal acceleration/deceleration, for the ego vehicle to reach the gap are the smallest.

As yet an alternative, the largest available gap could be selected.

According to the disclosure, there is provided a gap selection system for a vehicle, i.e., a system for gap selection. The gap selection is performed when the vehicle travels on a road comprising a first lane and a second lane being adjacent to the first lane. The vehicle travels in the first lane, a plurality of k surrounding vehicles travel in the second lane with a plurality of (k−1) between two adjacent surrounding vehicles, k being an integer and being at least 2, i being an integer between 1 and k, j being an integer between 1 and (k−1), a j-th gap being located between an i-th surrounding vehicle ($S_i$) and an (i+1)-th surrounding vehicle. The gap selection system comprises a unit for determining a minimum safety margin for an i-th surrounding vehicle as a longitudinal distance between the surrounding vehicle and the vehicle provided with the gap selection system, a unit for determining a minimum limit for a longitudinal position of the vehicle utilizing dynamic limitations of the vehicle and a predicted position of the surrounding vehicle behind the gap considering the minimum safety margin related to the surrounding vehicle, a unit for determining a maximum limit for a longitudinal position of the vehicle utilizing dynamic limitations of the vehicle, a predicted position of the surrounding vehicle in front of the gap considering the minimum safety margin related to the surrounding vehicle, a unit for determining a lane change appropriateness of the gap utilizing the minimum limit and the maximum limit for a longitudinal position of the vehicle provided with the gap selection system.

The gap selection system may be a system of the vehicle. Alternatively, or as a complement, the gap selection system may be a separate mobile device, which can be placed and used in the vehicle.

The gap selection system may further comprise one or more of a sensing system for determining relative positions and velocities of the surrounding vehicles and/or additional surrounding vehicles, a unit for determining if the automated lane change maneuver is desirable, a unit for planning a trajectory to execute the automated lane change maneuver.

According to the disclosure, there is also provided a vehicle comprising a gap selection system as described herein.

BRIEF DESCRIPTION OF THE DRAWINGS

The present disclosure will hereinafter be further explained by means of non-limiting examples with reference to the appended drawings wherein:

FIG. 3 illustrates a gap selection system.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
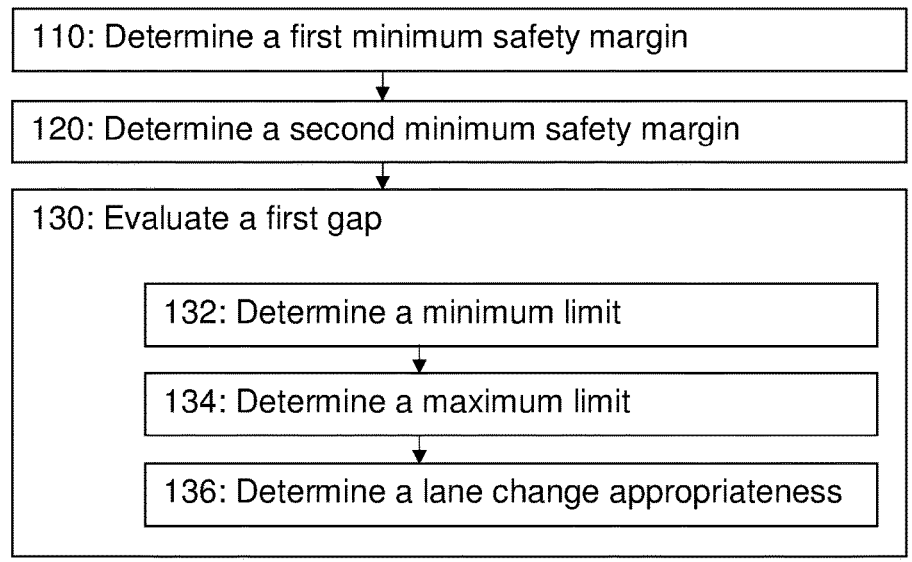
FIG. 1 illustrates a gap selection method for a first gap.

FIG. 1 schematically illustrates a gap selection method according to the disclosure for a first gap. It is assumed that a vehicle travels on a road comprising a first lane and a second lane being adjacent to the first lane. The vehicle travels in the first lane. A first surrounding vehicle travels in the second lane. A second surrounding vehicle travels in the second lane ahead of the first surrounding vehicle with a first gap between the first and second surrounding vehicles. The method comprises 110 determining a first minimum safety margin as a longitudinal distance between the first surrounding vehicle and the vehicle, 120, determining a second minimum safety margin as a longitudinal distance between the second surrounding vehicle and the vehicle, and 130 evaluating the first gap by 132, determining a minimum limit for a longitudinal position of the vehicle utilizing dynamic limitations of the vehicle and a predicted position of the first surrounding vehicle considering the first minimum safety margin 134, determining a maximum limit for a longitudinal position of the vehicle utilizing dynamic limitations of the vehicle and a predicted position of the second surrounding vehicle considering the second minimum safety margin, and 136, determining a lane change appropriateness of the first gap utilizing the minimum limit and the maximum limit for a longitudinal position of the vehicle.

The gap selection method may be generalized to (k−1) gaps by assuming that a plurality of k surrounding vehicles travel in the second lane with a plurality of (k−1) gaps between two adjacent surrounding vehicles, k being an integer and being at least 2, i being an integer between 1 and k, j being an integer between 1 and (k−1), a j-th gap being located between an i-th surrounding vehicle and an (i+1)-th surrounding vehicle. See FIG. 2. The method comprising 210, determining a minimum safety margin for an i-th surrounding vehicle as a longitudinal distance between the surrounding vehicle and the vehicle provided with the gap selection system, and 220 evaluating a j-th gap by 222 determining a minimum limit for a longitudinal position of the vehicle utilizing dynamic limitations of the vehicle and a predicted position of the i-th surrounding vehicle behind the gap considering the minimum safety margin related to the i-th surrounding vehicle, 224 determining a maximum limit for a longitudinal position of the vehicle utilizing dynamic limitations of the vehicle and a predicted position of the (i+1)-th surrounding vehicle in front of the gap considering the minimum safety margin related to the (i+1)-th surrounding vehicle, and 226 determining a lane change appropriateness of the gap utilizing the minimum limit and the maximum limit for a longitudinal position of the vehicle provided with the gap selection system.

Figure 2:
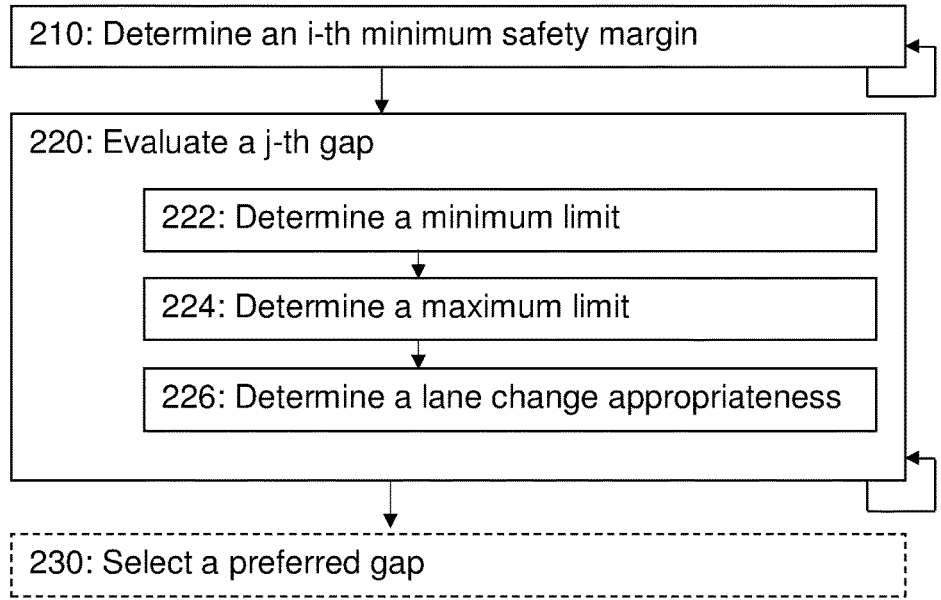
FIG. 2 illustrates a gap selection method for a plurality of gaps.

The method may be performed for one or more of the (k−1) gaps, including for each gap, indicated by back-pointing arrows in FIG. 2. The order in which the gaps are evaluated may be arbitrary. The gaps may be evaluated in numerical order. However, in practice, it may be best to start with the gap being closest to the vehicle comprising the gap selection system, also denoted the ego vehicle herein, and then take the second closest gap and so on. There may further be a maximal limit for how far away the gap is in relation to the ego vehicle in order to be evaluated.

For the case k=2, there will be one gap, i.e. the evaluation of the first gap described above. For k=3 there will be the above-described first gap plus a second gap and so on.

The method may further comprise 220 evaluating at least two of the gaps. 230: Selecting a desired gap.

The desired gap may be a gap coming first in time and offering a lane change appropriateness being above a critical value $A_{crit}$. As an alternative, or a complement, the desired gap may be a gap for which the required control signals, e.g., longitudinal acceleration/deceleration, for the ego vehicle to reach the gap are the smallest. As yet an alternative, the largest available gap could be selected.

FIG. 3 illustrates a gap selection system 300 for a vehicle. The gap selection system 300 comprises a unit 310 for determining a minimum safety margin for an i-th surrounding vehicle as a longitudinal distance between the surrounding vehicle and the vehicle provided with the gap selection system, a unit 320 for determining a minimum limit for a longitudinal position of the vehicle utilizing dynamic limitations of the vehicle and a predicted position of the surrounding vehicle behind the gap considering the minimum safety margin related to the surrounding vehicle, a unit 330 for determining a maximum limit for a longitudinal position of the vehicle utilizing dynamic limitations of the vehicle, a predicted position of the surrounding vehicle in front of the gap considering the minimum safety margin related to the surrounding vehicle, a unit 340 for determining a lane change appropriateness of the gap utilizing the minimum limit and the maximum limit for a longitudinal position of the vehicle provided with the gap selection system.

The gap selection system may further comprise one or more of a sensing system 350, which may comprise any type of known sensor or sensors, for determining relative positions and velocities of the surrounding vehicles, a unit 360 for determining if the automated lane change maneuver is desirable, and a unit 370 for planning a trajectory to execute the automated lane change maneuver.

Those skilled in the art will also appreciate that any or all of the systems and/or units 300, 310, 320, 330, 340, 350, 360 and 370 and/or any other unit, system or device described herein may comprise, in whole or in part, a combination of analog and digital circuits and/or one or more processors configured with software and/or firmware, e.g., stored in a memory, that when executed by the one or more processors perform the functions and/or operations described herein. One or more of such processors, as well as other digital hardware, may be included in a single ASIC (Application- Specific Integrated Circuitry), or several processors and various digital hardware may be distributed among several separate components, whether individually packaged or assembled into a SoC (System-on-a-Chip).

Furthermore, the systems and/or units 300, 310, 320, 330, 340, 350, 360 and 370 and/or any other unit, system or device described herein may for instance be implemented in one or several arbitrary nodes comprised in a vehicle. A node may be an electronic control unit (ECU) or any suitable generic electronic device, and may involve, for instance, a main central node. The node may, as a complement to being represented by, e.g., one or several integrated ECUs, be represented by a plug-in solution, for instance a dongle. In that manner, an aftermarket solution may be provided to any arbitrary vehicle suitable.

Figure 4:
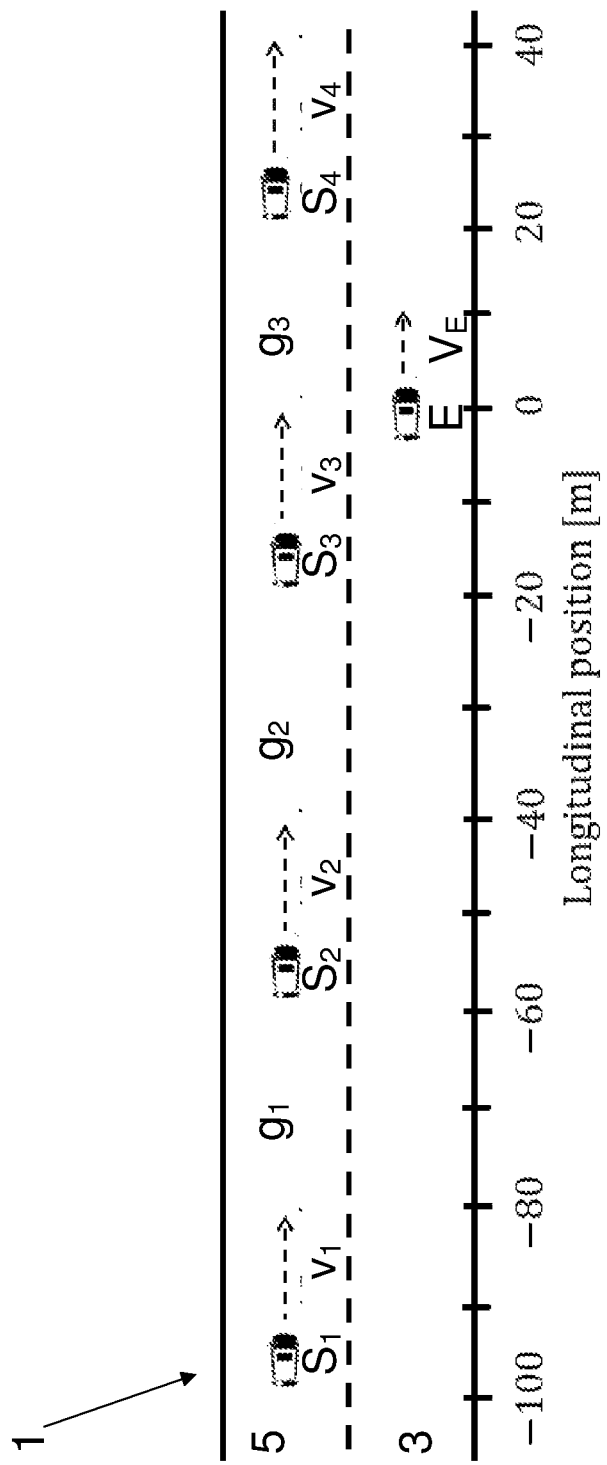
FIG. 4 illustrates a traffic situation with a first, a second and a third gap in a target lane.

FIG. 4 illustrates a traffic situation, wherein an ego vehicle E travels on road 1 having at least two adjacent lanes, a first lane 3 and a second lane 5 for traffic in the same direction. There may in addition be one or more additional lanes on the road 1 in the same direction and/or in the other direction. The ego vehicle E travels in a first lane 3, i.e. the current lane. In a second lane 5, which is adjacent to the first lane 3 and forms a target lane for a lane change maneuver, there are four surrounding vehicles, a first $S_1$, a second $S_2$, a third $S_3$ and a fourth $S_4$ surrounding vehicle. The second surrounding vehicle $S_2$ drives in front of the first surrounding vehicle $S_1$ forming a first gap $g_1$. The third surrounding vehicle $S_3$ drives in front of the second surrounding vehicle $S_2$ forming a second gap $g_2$. The fourth surrounding vehicle $S_4$ drives in front of the third surrounding vehicle $S_3$ forming a third gap $g_3$.

Sometimes a lane change of the ego vehicle E from its current lane, i.e. the first lane 3, into the target lane, i.e. the second lane 5, is desirable, e.g. when there is a slow preceding vehicle in the same lane as the ego vehicle E or when there is a faster vehicle coming from behind. A lane change may also be desirable when the lane in which the ego vehicle travels ends, e.g. due to road work. As a part of a lane change maneuver a gap selection may be made. The gap selection method as disclosed herein is suitable for automated gap selection. The gap selection method may form part of an automated lane change maneuver.

The gap select method performs an evaluation of a target gap in the target lane 5, and at which time instance the ego vehicle E should laterally move into the selected gap. If more than one gap, the method may help to select the most appropriate. The method may utilize parameters such as the required control signals to reach the gap, i.e. longitudinal acceleration/deceleration, and time instance to initialize the lateral movement into the gap.

The ego vehicle E is provided with a gap selection system (300), which is further described above. The gap selection system is adapted to perform an automated gap selection by means of the gap selection method described herein. The ego vehicle E of FIG. 4 is further provided with another system, which may comprise any type of known sensor or sensors, and which is adapted to determine a position on the road 1 of the ego vehicle E and its velocity. Other systems (350) are able to determine positions and velocities $v_1, v_2, v_3, v_4$ of the surrounding vehicles $S_1, S_2, S_3, S_4$ in relation to the ego vehicle E.

A minimum safety margin, $m_i$, to each surrounding vehicle $S_1$ may e.g. be defined by Eq. 1 above. The minimum safety margin is expressed as a longitudinal distance. It is typically not constant but varies over the prediction time, e.g. dependent on the velocities of the vehicles. Further, environmental factors, such as darkness, precipitation and road conditions may influence the minimum safety margin. The minimum safety margin may consider the extension of the ego vehicle E and/or of the surrounding vehicles $S_1, S_2, S_3, S_4$. The minimum safety margin may be determined to central point of the ego vehicle E and/or of the surrounding vehicles $S_1, S_2, S_3, S_4$, e.g. a center of gravity. As an alternative, the minimum safety margin to a surrounding vehicle $S_1, S_2, S_3, S_4$ may be determined from a point of the surrounding vehicle $S_1, S_2, S_3, S_4$ being closest to the ego vehicle E. For the ego vehicle E a point being closest to the surrounding vehicle $S_1, S_2, S_3, S_4$ may then be utilized.

The minimum safety margin $m_i$ depends on the velocity $v_E$ of the ego vehicle E if the surrounding vehicle is ahead of the ego vehicle E, see upper line of Eq. 1 and $S_4$ in FIG. 4. If the surrounding vehicle is behind the ego vehicle E, the minimum safety margin depends on the velocity $v_i$ of the surrounding vehicle, see lower line of Eq. 1 and $S_1, S_2, S_3$ in FIG. 4.

When evaluating a gap $g_j$ between two surrounding vehicles, $S_i$ and $S_{i+i}$, minimum and maximum limits for a longitudinal position $x_j$ of the ego vehicle E at a certain point of time are determined, e.g. according to Eq. 2 and 3 above.

A lane change appropriateness for the gap $g_j$ may be determined by means of a time-position area $A_j$. See Eq. 6 and 7 above.

Figure 5:
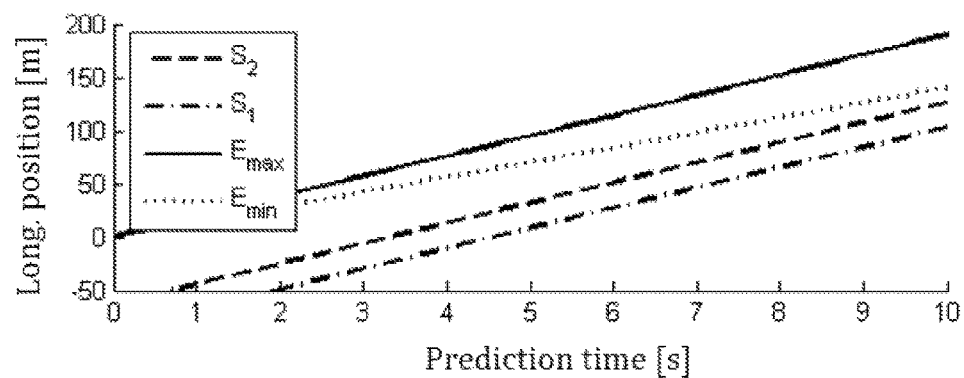
FIG. 5 illustrates an evaluation of the first gap.
Figure 6:
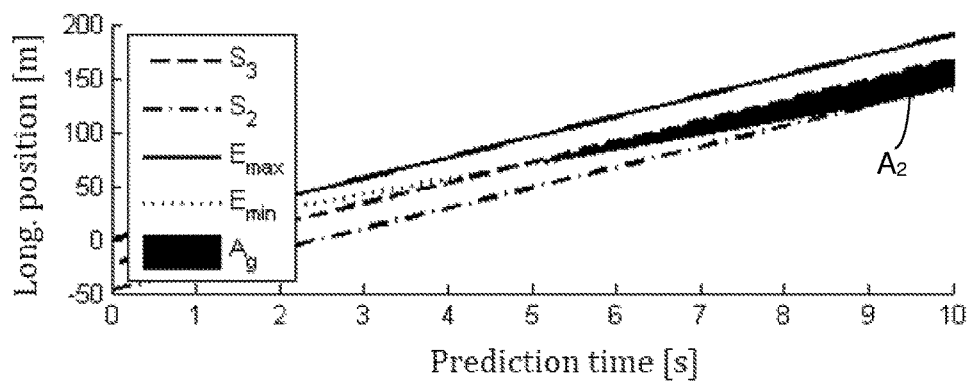
FIG. 6 illustrates an evaluation of the second gap.
Figure 7:
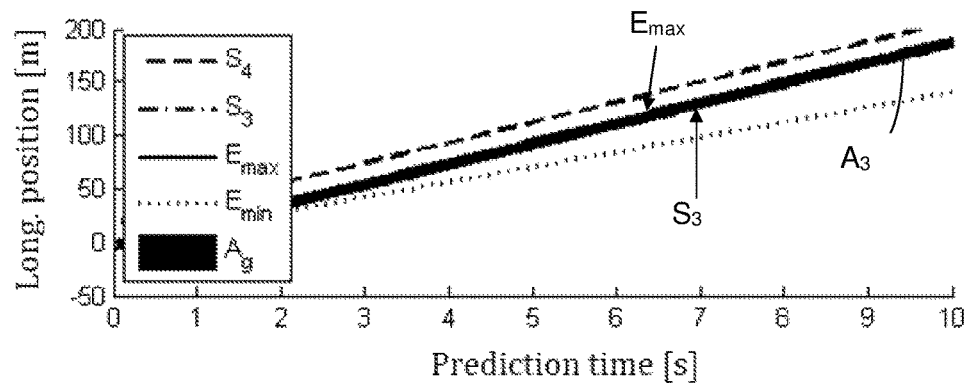
FIG. 7 illustrates an evaluation of the third gap.

FIGS. 5-7 below illustrate the situation for the three gaps of FIG. 4. In FIGS. 4-7, it is assumed that the surrounding vehicles $S_1, S_2, S_3, S_4$ have velocities of $v_1=v_2=v_3=v_4=19$ m/s and the ego vehicle a velocity $v_E$ of 15 m/s. However, this is only an example. According to the gap selection method as described herein, the ego vehicle E and each surrounding vehicle may have any velocity or even stand still. In particular, the velocities may differ between the surrounding vehicles. It is further assumed in the examples illustrated in FIGS. 4-7, that the minimum safety margins $m_i$ are constant during the predicted time span. However, as mentioned above, the minimum safety margin is typically not constant but varies over the prediction time, e.g. dependent on the velocities of the vehicles. Further, environmental factors, such as darkness, precipitation and road conditions may influence the minimum safety margin.

FIG. 5 illustrates an evaluation of the first gap $g_1$ between the first surrounding vehicle $S_1$ and the second surrounding vehicle $S_2$. In FIG. 5, $S_1$ denotes the predicted position of the first surrounding vehicle considering the minimum safety margin determined by Eq. 1 above, represented by a dash-pointed line in FIG. 5, and $S_2$ denotes the predicted position of the second surrounding vehicle considering the minimum safety margin determined by Eq. 1 above, represented by a dashed line in FIG. 5. The continuous line represents the maximum possible longitudinal position of the ego vehicle $E_{max}$. The dotted line represents the minimum possible longitudinal position of the ego vehicle $E_{min}$. However, for the first gap $g_1$, the minimum possible longitudinal position $E_{min}$, of the ego vehicle E is larger than the predicted position of the second surrounding vehicle $S_2$ considering the minimum safety margin for the whole illustrated time frame of 10 seconds. Hence, the ego vehicle E would not be able to use the first gap $g_1$ during the illustrated time frame.

FIG. 6 illustrates an evaluation of the second gap $g_2$ between the second surrounding vehicle $S_2$ and the third surrounding vehicle $S_3$. In FIG. 6, $S_2$ denotes the predicted position of the second surrounding vehicle considering the minimum safety margin determined by Eq. 1 above, represented by a dash-pointed line in FIG. 6 and $S_3$ denotes the predicted position of the third surrounding vehicle considering the minimum safety margin determined by Eq. 1 above, represented by a dashed line in FIG. 6. The dotted and continuous lines represent the minimum $E_{min}$, and maximum $E_{max}$ possible longitudinal position of the ego vehicle E, similar as for FIG. 5. At the beginning of the illustrated time frame and until about 5 seconds, $E_{min}$, the minimum possible longitudinal position of the ego vehicle E is larger than the predicted position of the third surrounding vehicle $S_3$ considering the minimum safety margin. Hence, the ego vehicle E would not be able to use the second gap $g_2$ during the time of 0-5 seconds. However, thereafter the second gap $g_2$ is available. This is illustrated as a black area representing the time-position area $A_2$ for the second gap $g_2$ in FIG. 6. The start time $t^{start}$ is about 5 seconds.

FIG. 7 illustrates an evaluation of the third gap $g_3$ between the third surrounding vehicle $S_3$ and the fourth surrounding vehicle $S_4$. In FIG. 7, $S_3$ denotes the predicted position of the third surrounding vehicle considering the minimum safety margin determined by Eq. 1 above, represented by a dash-pointed line in FIG. 7 and $S_4$ denotes the predicted position of the fourth surrounding vehicle considering the minimum safety margin determined by Eq. 1 above, represented by a dashed line in FIG. 7. The dotted and continuous lines represent the minimum $E_{min}$ and maximum $E_{max}$ possible longitudinal position of the ego vehicle E, similar as for FIGS. 5 and 6. Since the line of the maximum possible longitudinal position $E_{max}$ of the ego vehicle E is larger than the predicted position of the third surrounding vehicle $S_3$ considering the minimum safety margin, the third gap $g_3$ is available during the whole predicted time span, illustrated as a black area representing the time-position area $A_3$ for the second gap $g_3$ in FIG. 7.

If more than one gap is available, the next step of the method may be to select which of the possible gaps is desired. The desired gap may be selected as the first available gap, i.e. the gap for which the start time $t^{start}$ is smallest. As an alternative, the gap for which the required control signals to reach the gap, i.e. longitudinal acceleration/deceleration, would be the smallest change for the ego vehicle E may be selected. As yet an alternative, the largest available gap could be selected.

In the illustrated example of FIGS. 4-7, both the second gap $g_2$ and the third gap $g_3$ are available. Therefore the next step of the method may be to select which of the available gaps is desired. As mentioned above, the desired gap may be selected as the first available gap, i.e. the gap for which $t^{start}$ is smallest. In the illustrated example, that would be the third gap $g_3$.

In the example illustrated in FIGS. 4-7, the evaluation of the gaps started by the first gap $g_1$. However, in practice it may be best to start with the gap being closest to the ego vehicle E, which would be the third gap $g_3$ in the example above. There may further be a maximal limit for how far away the gap is in relation to the ego vehicle E in order to be evaluated. For example, in the illustrated example of FIGS. 4-7, it would not make sense to evaluate a gap being further behind the first surrounding vehicle $S_1$.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A gap selection method performed by a gap selection system for a vehicle travelling on a road comprising a first lane and a second lane adjacent to the first lane, the vehicle travelling in the first lane, a plurality of k surrounding vehicles traveling in the second lane with a plurality of gaps between two adjacent surrounding vehicles, k is an integer of at least 3, i is an integer between 1 and k, j is an integer between 1 and (k−1) and a j-th gap is located between an i-th surrounding vehicle and an (i+1)-th surrounding vehicle, the method comprising:
   determining a minimum safety margin for the i-th surrounding vehicle as a longitudinal distance between the i-th surrounding vehicle and the vehicle provided with the gap selection system;
   evaluating the j-th gap by determining a minimum limit for a longitudinal position of the vehicle utilizing dynamic position longitudinal information of the vehicle and a predicted position of the i-th surrounding vehicle behind the j-th gap considering the minimum safety margin related to the i-th surrounding vehicle;
   determining a maximum limit for a longitudinal position of the vehicle utilizing dynamic longitudinal position information of the vehicle and a predicted position of the (i+1)-th surrounding vehicle in front of the j-th gap considering the minimum safety margin related to the (i+1)-th surrounding vehicle;
   determining a lane change appropriateness value of the j-th gap by means of a time-position area, the time-position area determined as a function of the minimum limit and the maximum limit for a longitudinal position of the vehicle during a time span;
   evaluating at least two j-th gaps based on at least one parameter;
   selecting one of the at least two evaluated j-th gaps; and
   generating control signals required for the vehicle to reach the selected j-th gap.

2. The gap selection method according to claim 1 wherein selecting one of the at least two evaluated j-th gaps comprises selecting that j-th gap coming first in time and offering a lane change appropriateness value above a critical value.

3. The gap selection method according to claim 1 wherein selecting one of the at least two evaluated j-th gaps comprises selecting that j-th gap for which the required control signals for the vehicle provided with the gap selection system to reach that j-th gap are the smallest.

4. The gap selection method according to claim 1 wherein determining a maximum limit for a longitudinal position of the vehicle also considers an additional surrounding vehicle travelling in the first lane in front of the vehicle.

5. The gap selection method according to claim 1 wherein determining a minimum limit for a longitudinal position of the vehicle also considers an additional surrounding vehicle travelling in the first lane behind the vehicle.

6. The gap selection method according to claim 1 further comprising:
   determining a velocity of the vehicle; and
   utilizing the determined velocity of the vehicle when determining the minimum safety margin.

7. The gap selection method according to claim 1 further comprising:
   determining relative positions and relative velocities of one or more of the surrounding vehicles and/or additional surrounding vehicles in relation to the vehicle;
   utilizing the determined relative positions and velocities when determining the minimum safety margin.

8. The gap selection method according to claim 7 wherein determining relative positions and velocities of the surrounding vehicles and/or additional surrounding vehicles comprises determining by a sensing system of the vehicle.

9. The gap selection method according to claim 7 wherein the minimum safety margin for an i-th surrounding vehicle is determined as a front time gap times the velocity of the vehicle for a surrounding vehicle in front of the vehicle, and as a rear time gap times the velocity of a surrounding vehicle for a surrounding vehicle behind the vehicle, wherein the front time gap denotes a minimum desired time gap to a surrounding vehicle in front of the vehicle, and the rear time gap denotes a minimum desired time gap to a surrounding vehicle behind the vehicle.

10. A gap selection system for use in a vehicle when the vehicle is traveling on a road comprising a first lane and a second lane adjacent to the first lane, and when the vehicle is traveling in the first lane, and a plurality of k surrounding vehicles are traveling in the second lane with a plurality of gaps between two adjacent surrounding vehicles, where k is an integer of at least 3, i is an integer between 1 and k, j is an integer between 1 and (k−1), and a j-th gap is located between an i-th surrounding vehicle and an (i+1)-th surrounding vehicle, the gap selection system comprising:
   a unit for determining a minimum safety margin for an i-th surrounding vehicle as a longitudinal distance between the i-th surrounding vehicle and the vehicle provided with the gap selection system;
   a unit for determining a minimum limit for a longitudinal position of the vehicle utilizing dynamic longitudinal position information of the vehicle and a predicted position of the i-th surrounding vehicle behind the j-th gap considering the minimum safety margin related to the i-th surrounding vehicle;
   a unit for determining a maximum limit for a longitudinal position of the vehicle utilizing dynamic longitudinal position information of the vehicle, a predicted position of the (i+1)-th surrounding vehicle in front of the j-th gap considering the minimum safety margin related to the (i+1)-th surrounding vehicle; and
   a unit for determining a lane change appropriateness value of the j-th gap by means of a time-position area, the time-position area determined as a function of the minimum limit and the maximum limit for a longitudinal position of the vehicle during a time span;
   wherein the gap selection system is configured to evaluate at least two j-th gaps based on at least one parameter, select one of the at least two evaluated j-th gaps, and generate control signals required for the vehicle to reach the selected j-th gap.

11. The gap selection system according to claim 10 further comprising one or more of a sensing system for determining relative positions and relative velocities of the surrounding vehicles and/or additional surrounding vehicles, a unit for determining if the automated lane change maneuver is desirable, and a unit for planning a trajectory to execute the automated lane change maneuver.

12. A vehicle comprising a gap selection system according to claim 10.

13. The gap selection system according to claim 10 wherein the selected j-th gap comprises that j-th gap coming first in time and offering a lane change appropriateness value above a critical value.

14. The gap selection system according to claim 10 wherein the selected j-th gap comprises that j-th gap for which the required control signals for the vehicle provided with the gap selection system to reach that j-th gap are the smallest.

* * * * *